(12) United States Patent
Ikawa et al.

(10) Patent No.: US 11,665,193 B2
(45) Date of Patent: May 30, 2023

(54) METHOD FOR MANAGING PLANT, PLANT DESIGN DEVICE, AND PLANT MANAGEMENT DEVICE

(71) Applicant: CHIYODA CORPORATION, Yokohama (JP)

(72) Inventors: Shizuka Ikawa, Kanagawa (JP); Takehito Yasui, Kanagawa (JP); Kazuya Furuichi, Kanagawa (JP); Yuki Hamada, Kanagawa (JP)

(73) Assignee: CHIYODA CORPORATION, Kanagawa (JP)

( * ) Notice: Subject to any disclaimer, the term of this patent is extended or adjusted under 35 U.S.C. 154(b) by 0 days.

(21) Appl. No.: 17/710,297

(22) Filed: Mar. 31, 2022

(65) Prior Publication Data
US 2022/0221850 A1    Jul. 14, 2022

Related U.S. Application Data (63) Continuation of application No. PCT/JP2020/029957, filed on Aug. 5, 2020.

(51) Int. Cl.
*H04L 9/40* (2022.01)
*G06F 21/55* (2013.01)
*G05B 23/02* (2006.01)

(52) U.S. Cl.
CPC ...... *H04L 63/1433* (2013.01); *G05B 23/0262* (2013.01); *G05B 23/0272* (2013.01); *G05B 23/0283* (2013.01); *G06F 21/55* (2013.01); *H04L 63/14* (2013.01)

(58) Field of Classification Search
CPC . H04L 63/1433; H04L 63/14; G05B 23/0262; G05B 23/0272; G05B 23/0283; G05B 23/02; G05B 19/042; G06F 21/55; G06F 21/554; G06F 21/57; G06Q 10/063; G06Q 10/04
See application file for complete search history.

(56) References Cited

U.S. PATENT DOCUMENTS 7,472,420 B1 * 12/2008  Pavlyushchik ......... G06F 21/56
                                                          713/188

FOREIGN PATENT DOCUMENTS

| JP | 2016158194 A | 9/2016 | |
|---|---|---|---|
| JP | 6529690 B1 | 5/2019 | |
| WO | WO-2017105383 A1 * | 6/2017 | ........... G06F 21/577 |
| WO | WO-2021084567 A1 * | 5/2021 | |
| WO | WO-2021241580 A1 * | 12/2021 | |
| WO | WO-2022054329 A1 * | 3/2022 | |

OTHER PUBLICATIONS

JPO Decision To Grant A Patent for JP Patent Application No. 2021-513481; dated Oct. 26, 2021.

(Continued)

*Primary Examiner* — Sarah Su
(74) *Attorney, Agent, or Firm* — Cantor Colburn LLP (57) ABSTRACT

A plant management method includes: acquiring correlation information indicating a correlation between a component subjected to a cyberattack and a component to be possibly affected by the cyberattack when a plant including a plurality of components is subjected to the cyberattack; and zoning the plurality of components on the basis of the correlation information.

12 Claims, 9 Drawing Sheets

(56) References Cited

OTHER PUBLICATIONS

Wataru Machii, et al., "Dynamic Zoning of the Industrial Control System for Security Improvement," Technical Report of IEICE, (Japan: The Institute of Electronics, Information and Communication Engineers, Nov. 20, 2014), vol. 114, No. 340, p. 7-12, ISSN 0913-5685.
Intellectual Property India Office Action for corresponding IN Application No. 202237018702; dated Sep. 1, 2022.
International Search Report for International Application No. PCT/JP2020/029957; dated Oct. 27, 2020.
JPO Notification of Reasons for Refusal for corresponding JP Application No. 2021-513481; dated Jun. 15, 2021.
PCT International Preliminary Report on Patentability with Written Opinion of the International Searching Authority for International Application No. PCT/JP2020/029957; dated Feb. 16, 2023.
IPIN Office Action for corresponding IN Application No. 202237018702; dated Apr. 6, 2023.

* cited by examiner

|   | A | B | C | D |
|---|---|---|---|---|
| A | 1 | 0 | 1 | 0 |
| B | 0 | 1 | 0 | 1 |
| C | 0 | 0 | 1 | 0 |
| D | 0 | 0 | 0 | 1 |

FIG. 3B

|   | A | B | C | D |
|---|---|---|---|---|
| A | 1 | 0 | 1 | 0 |
| B | 0 | 1 | 0 | 1 |
| C | 0 | 0 | 1 | 0 |
| D | 0 | 0 | 0 | 1 |

METHOD FOR MANAGING PLANT, PLANT DESIGN DEVICE, AND PLANT MANAGEMENT DEVICE

CROSS REFERENCES TO RELATED APPLICATIONS

This application is a continuation under 35 U.S.C. § 120 of PCT/JP2020/029957, Aug. 5, 2020, which hereby claims priority of which and is incorporated herein by reference.

BACKGROUND OF THE INVENTION

1. Field of the Invention

The present disclosure relates to plant management technology, and more particularly, to a plant management method, and a plant design device and a plant management device that can be used for the plant management method.

2. Description of the Related Art

A plant control system (Industrial Control System: ICS) is used in a wide range of fields such as important infrastructure (electric power, gas, water supply, and the like) supporting life and manufacturing industry. For example, Patent Literature 1 discloses technology for acquiring a state value indicating a state of each of a plurality of control target devices during operation of a plant, and when an index calculated on the basis of a difference or a change rate of the difference between the acquired state value and a predicted value of a state value in the future meets a predetermined condition, reporting the fact.
Patent Literature 1: JP 6529690 B1

SUMMARY OF THE INVENTION

ICS in the conventional plant generally has an isolated network structure constructed with unique hardware, software, protocol, and the like. Therefore, ICS has been considered to be resistant to a cyberattack from the outside. However, in recent years, low-cost general-purpose devices have been used in many plants. Such a general-purpose device is likely to be a target of the cyberattack because detailed information is disclosed to the public. Since it is difficult to completely separate the plant from an external network and operate the plant, it is urgently necessary to develop technology for suppressing damage when the plant is subjected to the cyberattack, as a practical problem.

The present disclosure has been made in view of such a situation, and an object thereof is to suppress damage when a plant is subjected to a cyberattack.

In order to solve the above problem, a plant management method according to an aspect of the present disclosure includes: acquiring correlation information indicating a correlation between a component subjected to a cyberattack and a component to be possibly affected by the cyberattack when a plant including a plurality of components is subjected to the cyberattack; and zoning the plurality of components on the basis of the correlation information.

Another aspect of the present disclosure is a plant design device. The device includes: a correlation information acquirer structured to acquire correlation information indicating a correlation between a component subjected to a cyberattack and a component to be possibly affected by the cyberattack when a plant including a plurality of components is subjected to the cyberattack; and a zoning executer structured to zone the plurality of components on the basis of the correlation information.

Still another aspect of the present disclosure is a plant management device. The device includes: a state value acquirer structured to acquire a plurality of state values indicating states of a plurality of components during operation of a plant including the plurality of components; a state value predictor structured to predict a predicted value of each state value at a predetermined future time point on the basis of each of the plurality of acquired state values; an index calculator structured to calculate an index representing an importance indicating the magnitude of an influence on an important element, which has been selected from the plurality of components as a component having a large degree of influence on the operation of the plant when the plant is subjected to the cyberattack, by a difference or a change rate of the difference between each state value at the predetermined time point and each predicted value at the predetermined time point or a time point after the predetermined time point, or an urgency indicating urgency of the influence on the important element by the difference or the change rate of the difference; and an index presenter structured to present the calculated index.

Note that arbitrary combinations of the above components and conversions of an expression of the present invention between a method, a device, a system, a recording medium, a computer program, and the like are also effective as aspects of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

As an embodiment of the present disclosure, technology for suppressing damage when a plant is subjected to a cyberattack will be described.

In plants for producing chemical products, industrial products, and the like, a series of processes are performed by a large number of components such as a reactor, a heating furnace, and a valve. Each of the plurality of components constituting the plant communicates with the other components by communication mechanisms such as the Internet, a private network, and a USB. Therefore, there is a possibility that a component connected to an external network is used as a foothold and intrusion from the outside to an arbitrary component through the individual communication mechanism occurs. The plant is provided with a strict security system for suppressing occurrence of an abnormal event induced by a failure, an external cause, or the like. However, a component captured by a cyberattack is forced to perform an abnormal operation, and can induce an abnormal event that is not assumed by the security system. Since most of the components constituting the plant do not operate independently and may affect the other components in some form, the abnormal event occurring in the component captured by the cyberattack is propagated not only to the corresponding component but also to the other components. In a case where feedback control on a control target device by a plurality of control devices interferes with each other, a correlation between the plurality of components becomes more complicated, so that an unexpected abnormal event may expand to a wide range of components.

In order to solve such a problem, when the component constituting the plant is captured by the cyberattack and an abnormal event occurs, a plant management system according to an embodiment detects an abnormality at an early stage, isolates the captured component from the other components, and switches to manual control. As a result, it is possible to return the captured component to a normal state by the manual control while preventing the spread and intrusion of damage to the other components, so that it is possible to suppress damage due to the cyberattack.

As described above, an abnormal event that cannot occur in reality can be induced by the cyberattack. In addition, combinations of abnormal events that are hardly likely to occur simultaneously in reality can be induced simultaneously in many cases. In order to appropriately deal with such an abnormal event, the present inventors have recognized it as a problem that it is necessary to fundamentally review the design concept of the plant and design the plant on the assumption that even an abnormal event that has not been conventionally assumed can occur.

In order to solve such a problem, a plant design device according to an embodiment zones a plurality of components constituting a plant on the basis of a correlation between the components. For example, the plant design device zones the plurality of components on the basis of a matrix of correlation information indicating a correlation between a component subjected to the cyberattack and a component to be possibly affected by the cyberattack when any one of the plurality of components is subjected to the cyberattack. In addition, the plant is designed so that it is possible to suppress the spread and intrusion of damage from a zone subjected to the cyberattack to the other zones, in a case where the plant is subjected to the cyberattack. For example, types of hardware, software, communication protocol, and the like may be different for each zone. This can make it difficult to carry out intrusion to the other zones in the same way as intrusion to the zone subjected to the cyberattack. In addition, each zone is configured so that isolation by disconnection of communication, switching to manual control of the components, and the like can be performed for each zone, in a case where the zone is subjected to the cyberattack. As a result, it is possible to design a plant that is resistant to a cyberattack and can suppress the spread of damage in a case where the plant is subjected to the cyberattack, so that the damage due to the cyberattack can be suppressed.

In order to suppress the damage due to the cyberattack to be smaller, it is necessary to prevent an important element selected from the plurality of components as a component having a large degree of influence on the operation of the plant from falling into an abnormal state. Therefore, the plant design device according to the present embodiment zones the plurality of components so that it is possible to effectively block propagation of an influence from the component subjected to the cyberattack to the important element in a case where the component is subjected to the cyberattack. The plant design device zones the plurality of components, for example, on the basis of a fault tree with the important element as an upper event. As a result, even in a case where the plant is subjected to the cyberattack, the influence on the important element can be suppressed, so that the damage due to the cyberattack can be suppressed.

When the plant is actually subjected to the cyberattack, it is necessary to detect the fact of being subjected to the cyberattack at an early stage and report the fact to an operator, and to present, to the operator, information necessary for the operator to determine countermeasures such as zone isolation, switching to manual operation, plant operation continuation, and plant operation stop in an easy-to-understand manner. Technology for detecting the cyberattack will be described later. As technology for presenting necessary information to the operator, the technology disclosed in Patent Literature 1 described above can be used.

Figure 1:
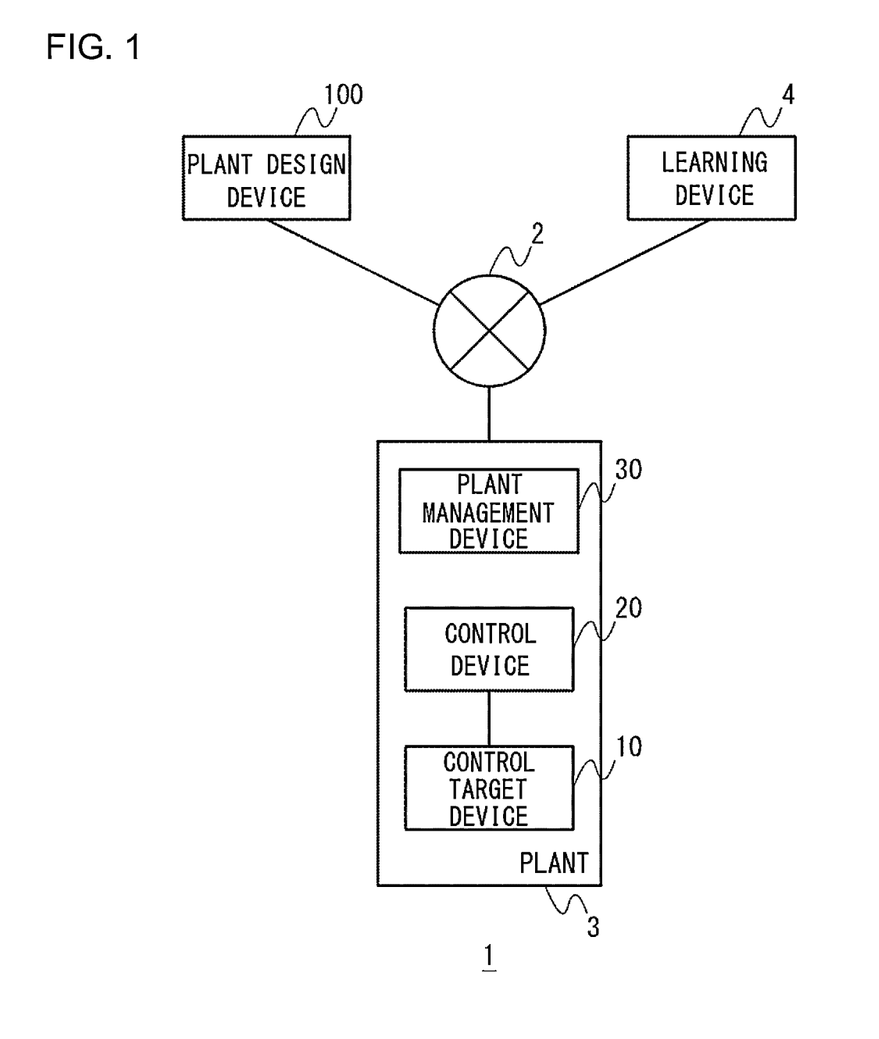
FIG. 1 is a diagram illustrating an overall configuration of a plant management system according to an embodiment.

FIG. 1 illustrates an overall configuration of a plant management system according to an embodiment. A plant management system 1 includes a plant 3 that produces chemical products, industrial products, and the like, a plant design device 100 that designs the plant 3, and a learning device 4 that learns an algorithm used in a plant management device 30. The plant 3 and the learning device 4 are connected by an arbitrary communication network 2 such as the Internet or an in-house connection system, and are operated in an arbitrary operation form such as on-premises or edge computing.

The plant 3 includes a control target device 10 such as a reactor or a heating furnace installed in the plant 3, a control device 20 that sets an operation amount for controlling an operation condition of the control target device 10, and a plant management device 30 that manages the plant 3 using an algorithm learned by the learning device 4.

First, technology for designing the plant 3 resistant to a cyberattack by the plant design device 100 will be described.

Figure 2:
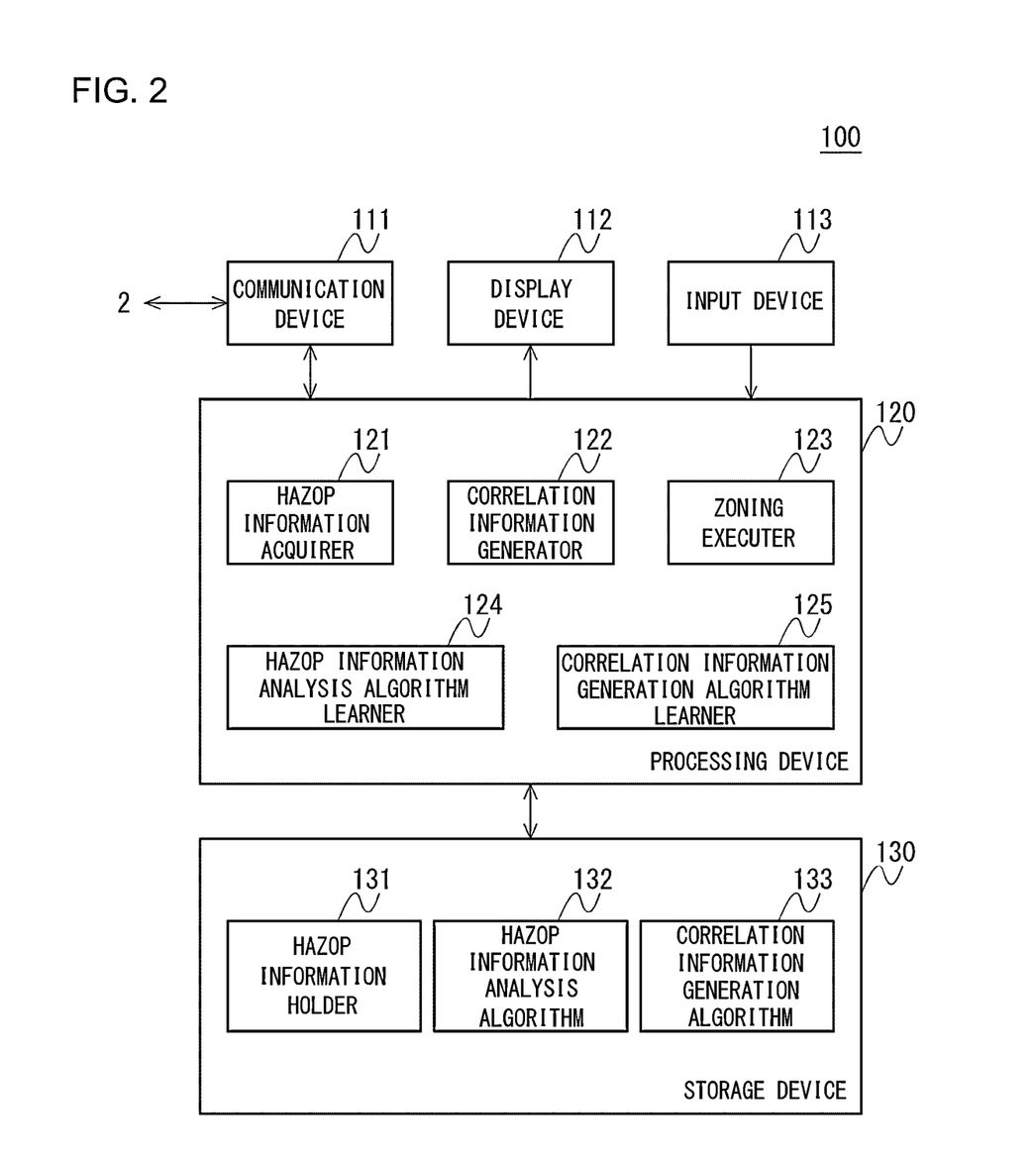
FIG. 2 is a diagram illustrating a configuration of a plant design device according to the embodiment.

FIG. 2 illustrates a configuration of the plant design device 100 according to the embodiment. The plant design device 100 includes a communication device 111, a display device 112, an input device 113, a processing device 120, and a storage device 130.

The communication device 111 controls wireless or wired communication. The display device 112 displays a display image generated by the processing device 120. The input device 113 inputs an instruction to the processing device 120.

The storage device 130 stores data and computer programs used by the processing device 120. The storage device 130 includes a HAZOP information holder 131, a HAZOP information analysis algorithm 132, and a correlation information generation algorithm 133.

The processing device 120 includes a HAZOP information acquirer 121, a correlation information generator 122, a zoning executer 123, a HAZOP information analysis algorithm learner 124, and a correlation information generation algorithm learner 125. In terms of hardware components, these configurations are realized by a CPU, a memory, a program loaded in a memory, and the like of an arbitrary computer, but here, functional blocks realized by cooperation thereof are illustrated. Therefore, it is understood by those skilled in the art that these functional blocks can be realized in various forms by only hardware, only software, or a combination thereof.

The HAZOP information acquirer 121 acquires information generated or recorded in a Hazard and Operability Studies (HAZOP) or Safety Integrity Level (SIL) analysis performed on a plurality of components constituting the plant 3 at the time of evaluating the safety of the plant 3, and stores the information in the HAZOP information holder 131. The HAZOP is implemented for the purpose of thoroughly identifying potential risks of the plant, evaluating their effects and results, and taking necessary safety measures. The SIL analysis is performed for the purpose of improving the safety of the plant by determining a required safety soundness level on the basis of the magnitude of process risks related to safety, environment, and assets, and reasonably determining a facility configuration and a functional test frequency necessary for maintaining the safety soundness level. The information regarding the HAZOP or SIL analysis includes voices, images, texts, and the like.

The correlation information generator 122 analyzes the information held in the HAZOP information holder 131 to generate correlation information indicating a correlation between the plurality of components constituting the plant 3. First, the correlation information generator 122 analyzes the HAZOP information held in the HAZOP information holder 131 using the HAZOP information analysis algorithm 132, and converts the HAZOP information into text information. The correlation information generator 122 analyzes the converted text information by a natural language analysis method such as morphological analysis, and extracts an operation trouble that may occur due to a failure, abnormality, stop, or the like of the plurality of components constituting the plant 3. Further, the correlation information generator 122 generates a fault tree from the extracted information using the correlation information generation algorithm 133. As a result, since it is possible to automatically generate the fault tree with an important element as an upper event from the HAZOP information, it is possible to specify an important element important in terms of control and a component important in terms of security for preventing stop or abnormal operation of the important element.

The zoning executer 123 zones the plurality of components constituting the plant 3 on the basis of the correlation information generated by the correlation information generator 122. The zoning executer 123 may generate a matrix representing a correlation between the plurality of components from the correlation information, and zone the plurality of components by matrix calculation or the like.

The HAZOP information analysis algorithm learner 124 learns the HAZOP information analysis algorithm 132. The HAZOP information analysis algorithm 132 may analyze the HAZOP information by using a dictionary that stores nouns, verbs, adjectives, adjective verbs, and the like expressing the names, functions, operations, aspects and degrees of abnormalities and failures, and the like of the components included in the HAZOP information. In this case, the HAZOP information analysis algorithm learner 124 may learn the dictionary using the HAZOP information acquired in the past as learning data.

The correlation information generation algorithm learner 125 learns the correlation information generation algorithm 133. The correlation information generation algorithm 133 may analyze an expression representing a correlation between a plurality of components from the text information extracted by the HAZOP information analysis algorithm 132, and generate correlation information. In this case, the correlation information generation algorithm learner 125 may perform machine learning on the correlation information generation algorithm 133 using the text information extracted from the HAZOP information acquired in the past and the correlation information between the plurality of components as learning data.

Figure 3A:
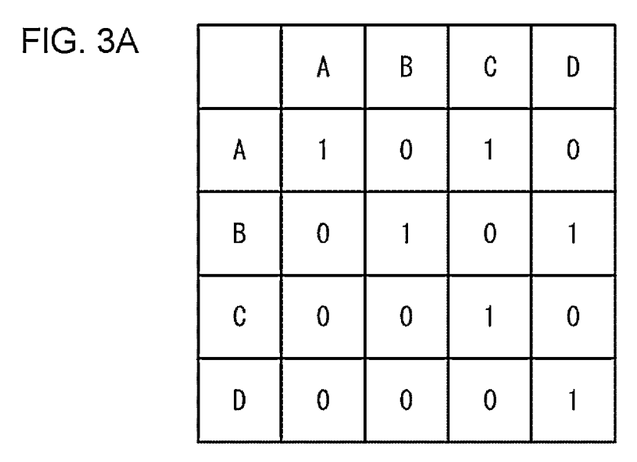
FIG. 3A and FIG. 3B are diagrams illustrating an example of a correlation between a plurality of components constituting a plant.
Figure 3B:
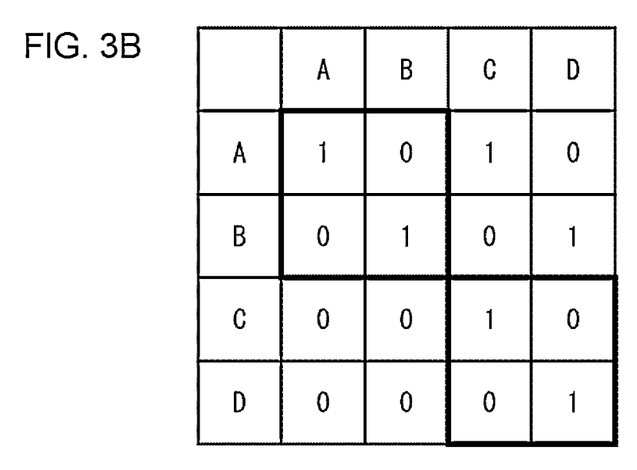

FIG. 3A and FIG. 3B illustrate an example of a correlation between the plurality of components constituting the plant 3. FIG. 3A illustrates a matrix in which, when abnormalities occur in components A, B, C, and D, the affected components are represented by "1" and the unaffected components are represented by "0". In the example of FIG. 3A, an influence of the abnormality of the component A spreads to the component C, and an influence of the abnormality of the component B spreads to the component D. FIG. 3B illustrates an example of zoning by the zoning executer 123. The zoning executer 123 divides the components A and C and the components B and D having a correlation into different zones, and zones the components such that each of the components A and B and the components C and D that do not affect each other is in the same zone. As a result, when the component A or B is subjected to the cyberattack, the zone including the components A and B is isolated from the zone including the components C and D, so that the influence of the abnormality occurring in the component A or B can be prevented from being propagated to the component C or D.

Although FIG. 3 illustrates a simplified example for convenience of description, a large number of components have a complicated correlation in the actual plant 3. Even in such a case, a plurality of components can be appropriately zoned by any known technology. The correlation information may include a control importance of each component, a degree of correlation between components, a condition, and the like.

After the plurality of components are properly zoned in this way, a detailed configuration of each zone is designed. Each zone may be physically partitioned or may be logically partitioned on a network. A zone boundary is provided with a configuration for blocking communication between zones. A configuration may be provided at the boundary of the zones to physically block flames, smoke, leaked gases, blasts, scattered materials, and the like.

Next, technology will be described in which, during operation of the plant 3 designed by the plant design device 100, the plant management device 30 detects a cyberattack on the plant 3 and reports the cyberattack to the operator, and the operator presents information necessary for considering countermeasures.

When the component of the plant 3 is subjected to the cyberattack, operation data such as the state quantity and the control quantity of the component of the plant 3 and communication data transmitted and received between the components of the plant 3 or between the component and the external network exhibit behavior different from that in a normal case. Therefore, the plant management device 30 according to the present embodiment detects the cyberattack using the cyberattack detection algorithm learned by clustering the operation data and the communication data acquired from the plant 3 when the plant 3 is normally operated.

Figure 4A:
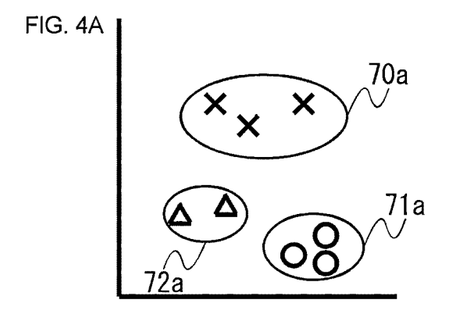
FIG. 4A to FIG. 4D are diagrams illustrating an example in which operation data and communication data of the plant are clustered.
Figure 4B:
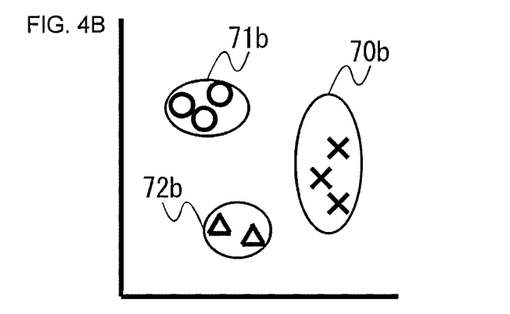

FIG. 4A to FIG. 4D illustrate an example in which operation data and communication data of the plant 3 are clustered. FIG. 4A illustrates an example in which the operation data of the plant 3 acquired from the plant 3 when the plant 3 is normally operated is clustered. A region 70*a* corresponds to a cluster of operation data during normal operation, a region 71*a* corresponds to a cluster of operation data during startup, and a region 72*a* corresponds to a cluster of operation data during shutdown. FIG. 4 illustrates an example in which the communication data when the plant 3 is normally operated is clustered. A region 70*b* corresponds to a cluster of communication data during normal operation, a region 71*b* corresponds to a cluster of communication data during startup, and a region 72*b* corresponds to a cluster of communication data during shutdown.

Figure 4C:
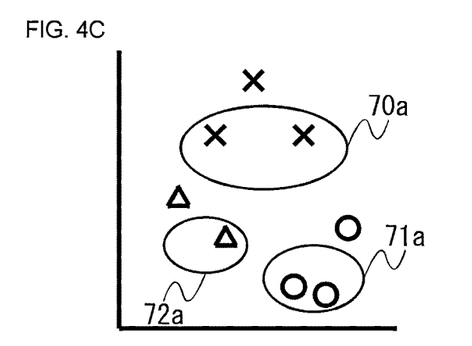
Figure 4D:
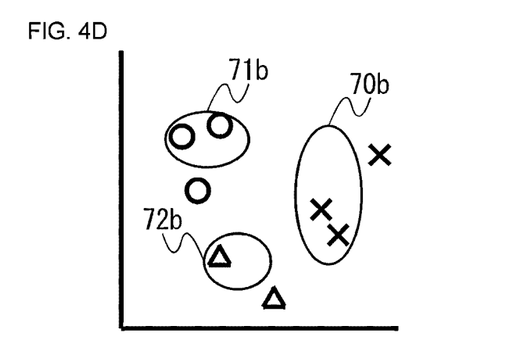

When the plant 3 is subjected to the cyberattack, the operation data and the communication data acquired from the plant 3 deviate from the regions corresponding to the clusters of the operation data and the communication data acquired when the plant 3 is normally operated as illustrated in FIG. 4C and FIG. 4D. At this time, the plant management device 30 detects that the plant 3 is subjected to the cyberattack.

The plant management device 30 may detect the cyberattack when both the operation data and the communication data are abnormal. When the operation data is normal and only the communication data is abnormal, it may be determined that a communication failure has occurred due to a failure of the communication device or the like. When the communication data is normal and only the operation data is abnormal, it may be determined that an abnormality has occurred in an operation state due to a factor other than the cyberattack. Since there is also a possibility that a hacker forges the operation data or the communication data, the plant management device 30 may detect the cyberattack when at least one of the operation data and the communication data is abnormal.

When the plant management device 30 detects the cyberattack, the plant management device 30 calculates and presents an index representing an importance and an urgency of the influence of the cyberattack on the important element as information to consider countermeasures by the operator. An algorithm for calculating the index representing the importance and the urgency of the influence is learned by the learning device 4.

Figure 5:
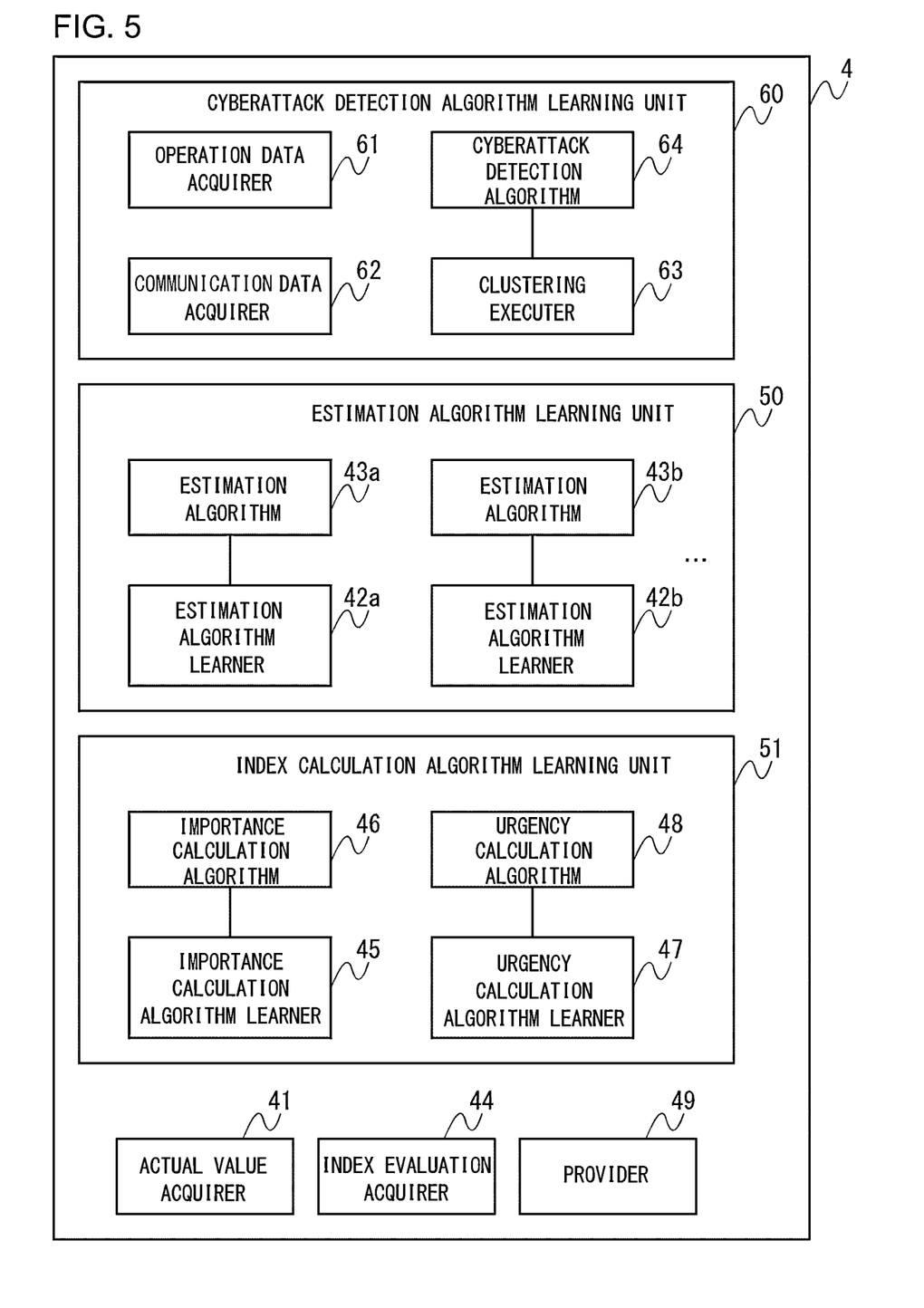
FIG. 5 is a diagram illustrating a configuration of a learning device according to the embodiment.

FIG. 5 illustrates a configuration of the learning device according to the embodiment. The learning device 4 includes a cyberattack detection algorithm learning unit 60, an actual value acquirer 41, an estimation algorithm learning unit 50, an index evaluation acquirer 44, an index calculation algorithm learning unit 51, and a provider 49. In terms of hardware components, these configurations are realized by a CPU, a memory, a program loaded in a memory, and the like of an arbitrary computer, but here, functional blocks realized by cooperation thereof are illustrated. Therefore, it is understood by those skilled in the art that these functional blocks can be realized in various forms by only hardware, only software, or a combination thereof.

The cyberattack detection algorithm learning unit 60 includes an operation data acquirer 61, a communication data acquirer 62, a clustering executer 63, and a cyberattack detection algorithm 64. The operation data acquirer 61 acquires operation data regarding the operation of the plant 3 when the plant 3 is normally operated. The communication data acquirer 62 acquires communication data regarding communication of the plant 3 when the plant 3 is normally operated.

The cyberattack detection algorithm 64 is used to detect the cyberattack on the plant 3 from the operation data and the communication data acquired during the operation of the plant 3. The cyberattack detection algorithm 64 may determine the presence or absence of the cyberattack by comparing features of the operation data and the communication data acquired during the operation of the plant 3 with features of the operation data and the communication data acquired when the plant 3 is normally operated. The cyberattack detection algorithm 64 may calculate feature amounts having different values at the normal time and the abnormal time from the operation data and the communication data.

The clustering executer 63 clusters the operation data acquired by the operation data acquirer 61 and the communication data acquired by the communication data acquirer 62, and learns the cyberattack detection algorithm. The clustering executer 63 learns the cyberattack detection algorithm 64 so that the feature amounts calculated from the operation data and the communication data using the cyberattack detection algorithm 64 are classified into different clusters according to the operation state of the plant 3. The clustering executer 63 learns a feature amount calculator in which feature amounts are held even when multi-dimensional information is dimensionally compressed or reduced, for example, by a method such as an autoencoder used for feature selection and feature extraction or T-distributed stochastic neighbor embedding.

The cyberattack detection algorithm 64 may be learned by an arbitrary method for classifying or clustering information that can be acquired when the plant 3 is operated according to the operation state of the plant 3. The cyberattack detection algorithm 64 may be learned by supervised learning or may be learned by unsupervised learning.

The estimation algorithm learning unit 50 includes a plurality of estimation algorithms 43*a*, 43*b*, . . . for calculating a predicted value of each of a plurality of state quantities that can be a factor of stop or failure of an important element, and a plurality of estimation algorithm learners 42*a*, 42*b*, (hereinafter, collectively referred to as the "estimation algorithm learner 42") for learning each of the plurality of estimation algorithms 43*a*, 43*b*, (hereinafter, collectively referred to as the "estimation algorithm 43").

The state quantity that can be the factor of the stop or failure of the important element is specified on the basis of the fault tree generated by the plant design device 100. The plant design device 100 determines a plurality of state quantities to be monitored, on the basis of an occurrence cause, an occurrence path, and an occurrence probability of a lower event that can be a factor of stop or failure of an important element that is an upper event The estimation algorithm learning unit 50 learns the estimation algorithm 43 for calculating predicted values of the plurality of state quantities to be monitored determined by the plant design device 100.

The estimation algorithm 43 is used to estimate a predicted value of each state value at a predetermined future time point, on the basis of each of a plurality of state values indicating the state of the plant 3. The predetermined future time point at which the predicted value is calculated may be determined by the type of the component constituting the plant 3, the type of the process, the change rate of the state quantity, the speed at which the value of the state quantity changes due to the change of the value of the control quantity, and the like, but may be, for example, about several seconds to several minutes later.

The actual value acquirer 41 acquires the past actual values of the plurality of state values and the setting values of the plurality of control quantities from the plant 3.

The estimation algorithm learner 42 learns the estimation algorithm 43 by machine learning on the basis of the past actual values of the plurality of state values and the setting values of the plurality of control quantities acquired by the actual value acquirer 41. When the actual values of the plurality of state values and the setting values of the plurality of operation amounts at a certain time point are input to the estimation algorithm 43, the estimation algorithm learner 42 learns the estimation algorithm 43 so that values close to the actual values of the plurality of state values at a time point when a predetermined time has elapsed from the certain time point are calculated. The estimation algorithm learner 42 may learn the estimation algorithm 43 by supervised learning using the past actual values acquired by the actual value acquirer 41 as teacher data, or may learn the estimation algorithm 43 by any other known machine learning technology.

Since the accuracy of the estimation algorithm 43 can be improved by performing learning of the estimation algorithm 43 using a large number of actual values, it is possible to generate the estimation algorithm 43 capable of calculating the predicted value of the state value indicating the state of the plant 3 more accurately. In addition, since it is not necessary to develop an advanced simulator for reproducing a complex process, the time and load required to generate the estimation algorithm 43 can be greatly reduced. In addition, since elements in which reproduction is difficult in the simulator can be added, the predicted value of the output can be calculated more accurately.

An index calculation algorithm is used to calculate an index representing the magnitude of the influence on the operation behavior of the important element and the urgency, on the basis of a difference or a change rate of the difference between a predicted value of each state value at a predetermined time point or a time point after the predetermined time point and an actual state value at the predetermined time point. In the index calculation algorithm, a difference between each state quantity and the past behavior or a change rate of the difference is weighted according to an occurrence probability of a plurality of state quantities to be monitored, an occurrence path to an upper event, the magnitude of the influence on the operation behavior of the important element by the important factor to be the upper event, and the like. The index includes an importance indicating the magnitude of the influence on the important element and an urgency indicating the urgency of the influence on the important element. In the importance, the difference between the predicted value of each state value and the actual state value and the magnitude of the change rate of the difference are mainly reflected, and in the urgency, the magnitude of the change rate of the difference between the current predicted value of each state value and the current actual state value, and the difference between the future predicted value of each state value and the current actual state value or the change rate of the difference are mainly reflected.

The index evaluation acquirer 44 acquires a history of the predicted value calculated for each state value and the actual value of the actual state value, and evaluation of the operation behavior of the important element. The evaluation of the operation behavior of the important element may be calculated from the history of the state values or the like, or may be input by the operator. The index evaluation acquirer 44 may acquire the history of the predicted value calculated for each state value and the actual value of the actual state value, and evaluation on the index calculated by an importance calculation algorithm 46 and an urgency calculation algorithm 48. The evaluation on the index may be a result of evaluation by the operator.

The index calculation algorithm learning unit 51 includes an importance calculation algorithm 46 that calculates an importance indicating the magnitude of the influence on the important element, an importance calculation algorithm learner 45 that learns the importance calculation algorithm 46, an urgency calculation algorithm 48 that calculates an urgency indicating the urgency of the influence on the important element, and an urgency calculation algorithm learner 47 that learns the urgency calculation algorithm 48.

The importance calculation algorithm learner 45 and the urgency calculation algorithm learner 47 respectively learn the importance calculation algorithm 46 and the urgency calculation algorithm 48, on the basis of the history of the predicted value and the actual value of the state value and the evaluation of the operation behavior of the important element acquired by the index evaluation acquirer 44. On the basis of the history of the predicted value and the actual value and the evaluation of the operation behavior of the important element acquired by the index evaluation acquirer 44, the importance calculation algorithm learner 45 and the urgency calculation algorithm learner 47 determine whether or not an index calculated by inputting a difference or a change rate of the difference between the predicted value and the state value at a certain time point or a later time point to the importance calculation algorithm 46 and the urgency calculation algorithm 48 correctly evaluates the importance and the urgency of the influence on the operation behavior of the important element, from the subsequent evaluation of the operation behavior of the important element. The importance calculation algorithm learner 45 and the urgency calculation algorithm learner 47 learn the importance calculation algorithm 46 and the urgency calculation algorithm 48 so that an index of a worse value is calculated when the subsequent operation behavior of the important element is evaluation worse than predetermined evaluation, and learn the importance calculation algorithm 46 and the urgency calculation algorithm 48 so that an index of a better value is calculated when the subsequent operation behavior of the important element is evaluation better than the predetermined evaluation. As described above, the importance calculation algorithm learner 45 and the urgency calculation algorithm learner 47 may learn the importance calculation algorithm 46 and the urgency calculation algorithm 48 by supervised learning in which the evaluation of the operation behavior of the important element acquired by the index evaluation acquirer 44 is used as teacher data, or may learn the importance calculation algorithm 46 and the urgency calculation algorithm 48 by any other known machine learning technology.

The index evaluation acquirer 44 may acquire, as teacher data, a value of an index calculated or evaluated by the operator without depending on the importance calculation algorithm 46 and the urgency calculation algorithm 48. In this case, the importance calculation algorithm learner 45 and the urgency calculation algorithm learner 47 learn the importance calculation algorithm 46 and the urgency calculation algorithm 48 so that a value of the index acquired by the index evaluation acquirer 44 is calculated when a difference or a change rate of the difference between the predicted value and the state value at a certain time point or a later time point is input to the importance calculation algorithm 46 and the urgency calculation algorithm 48.

The provider 49 provides the cyberattack detection algorithm 64 learned by the cyberattack detection algorithm learning unit 60, the estimation algorithm 43 learned by the estimation algorithm learner 42, and the importance calculation algorithm 46 and the urgency calculation algorithm 48 learned by the importance calculation algorithm learner 45 and the urgency calculation algorithm learner 47 to the plant management device 30.

Since an event in which the important element stops rarely occurs, it is difficult to learn the behavior of the plant 3 when the event occurs, on the basis of the past record of the event. However, in the present embodiment, since the magnitude of the influence on the operation behavior of the important element is indexed from a difference between the past operation record and the current operation state, it is possible to provide artificial intelligence capable of accurately detecting a state in which the important element can stop even if there is no record in which the important element stops.

In the drawing, the learning device 4 is illustrated as a single device for simplification of description, but the learning device 4 may be realized by a plurality of servers using cloud computing technology, distributed processing technology, or the like. As a result, it is possible to process a large amount of information collected from the plant 3 at high speed and perform learning of the cyberattack detection algorithm 64, the estimation algorithm 43, the importance calculation algorithm 46, and the urgency calculation algorithm 48. Therefore, it is possible to greatly shorten the time required to improve the accuracy of the cyberattack detection algorithm 64, the estimation algorithm 43, the importance calculation algorithm 46, and the urgency calculation algorithm 48.

Figure 6:
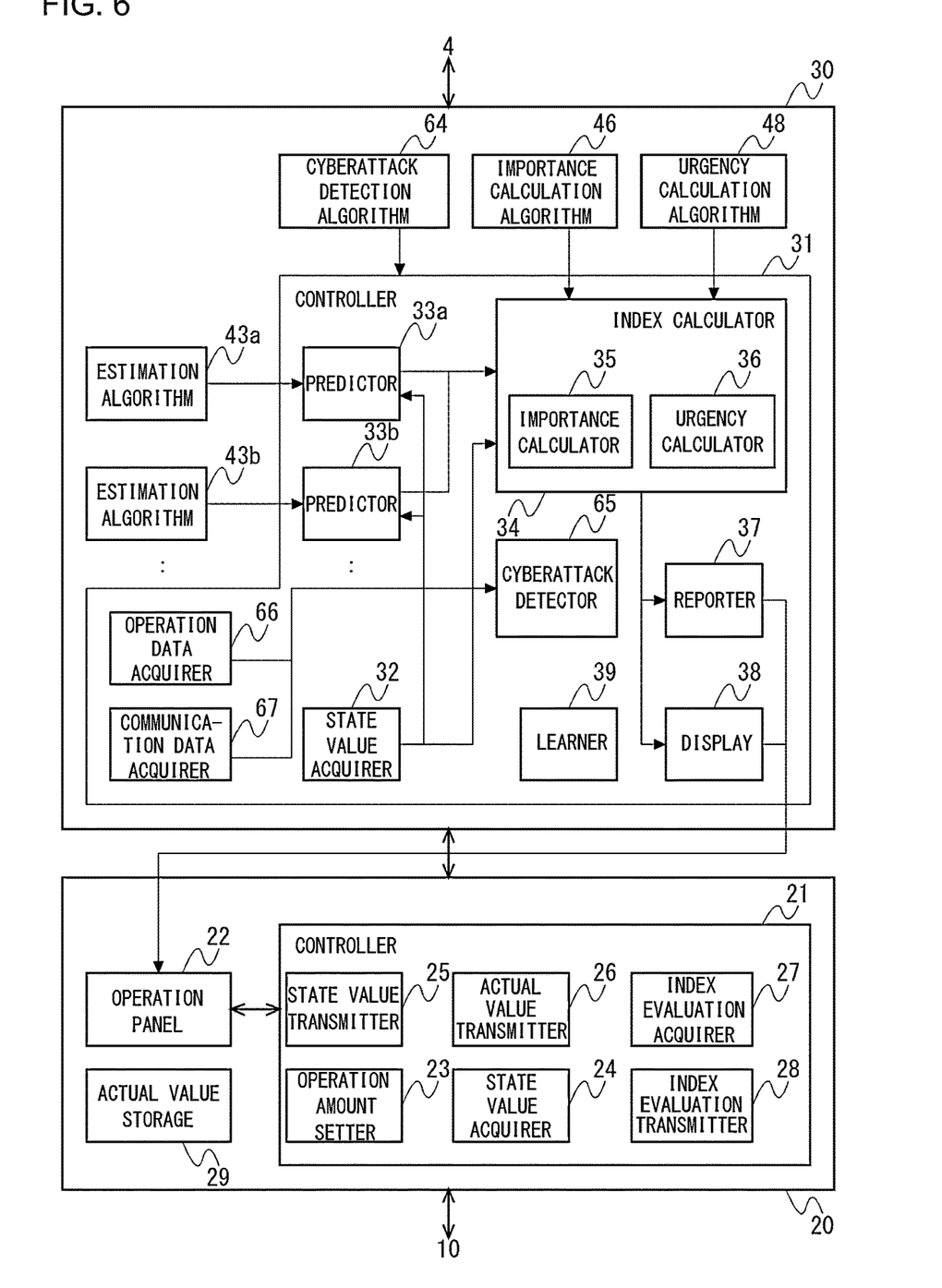
FIG. 6 is a diagram illustrating configurations of a plant management device and a control device according to the embodiment.

FIG. 6 illustrates configurations of the plant management device 30 and the control device 20 according to the embodiment. The control device 20 includes a controller 21, an operation panel 22, and an actual value storage 29.

The operation panel 22 displays various state values indicating the operation state of the plant 3, setting values of various operation amounts set by the control device 20, output values indicating the operation result of the plant 3, and the like on a display device, and receives inputs of setting values of various operation amounts from the operator.

The controller 21 includes an operation amount setter 23, a state value acquirer 24, a state value transmitter 25, an actual value transmitter 26, an index evaluation acquirer 27, and an index evaluation transmitter 28. These functional blocks can also be realized in various forms by only hardware, only software, or a combination thereof.

The operation amount setter 23 sets setting values of various operation amounts received from the operator by the operation panel 22, controls the control target device 10, and displays the setting values on the display device of the operation panel 22. The state value acquirer 24 acquires various state values indicating the operation state and the operation result of the plant 3 from various sensors, measuring instruments, and the like provided in the control target device 10 and the like, displays the various state values on the display device of the operation panel 22, and records the various state values in the actual value storage 29. The state value transmitter 25 transmits the state values acquired by the state value acquirer 24 to the plant management device 30. The actual value transmitter 26 transmits the value of the operation amount set by the operation amount setter 23 and the state value stored in the actual value storage 29 to the learning device 4.

The index evaluation acquirer 27 acquires an evaluation of the index displayed on the operation panel 22 from the operator. The index evaluation acquirer 27 may acquire an evaluation indicating that the index displayed on the operation panel 22 is too large or too small from the operator, or may acquire a correction value of the index displayed on the operation panel 22 from the operator. The index evaluation transmitter 28 transmits the evaluation of the index acquired by the index evaluation acquirer 27 from the operator to the learning device 4. The evaluation of the index is used to learn the importance calculation algorithm 46 and the urgency calculation algorithm 48 in the learning device 4 as described above.

The plant management device 30 includes a controller 31, an estimation algorithm 43, an importance calculation algorithm 46, an urgency calculation algorithm 48, and a cyberattack detection algorithm 64.

The controller 31 includes a state value acquirer 32, predictors 33a, 33b, . . . (hereinafter, collectively referred to as the "predictor 33"), an index calculator 34, a reporter 37, a display 38, a learner 39, a cyberattack detector 65, an operation data acquirer 66, and a communication data acquirer 67. These functional blocks can also be realized in various forms by only hardware, only software, or a combination thereof.

The cyberattack detection algorithm 64, the estimation algorithm 43, the importance calculation algorithm 46, and the urgency calculation algorithm 48 are acquired from the learning device 4 and stored in the storage device.

The operation data acquirer 66 acquires operation data of the plant 3. The operation data may be a state value acquired from the state value transmitter 25 of the control device 20, may be a setting value of the operation amount set by the operation amount setter 23, or may be arbitrary data that can be acquired from various sensors and components installed in the plant 3.

The communication data acquirer 67 acquires data related to communication data transmitted and received by the network inside the plant 3, communication data transmitted and received between the network outside the plant 3 and the network inside the plant 3, or the like.

The cyberattack detector 65 uses the cyberattack detection algorithm 64 to detect the cyberattack on the plant 3 on the basis of the operation data acquired by the operation data acquirer 66 and the communication data acquired by the communication data acquirer 67. When the cyberattack is detected, the cyberattack detector 65 reports the fact to the operator from the reporter 37.

The state value acquirer 32 acquires a plurality of state values from the state value transmitter 25 of the control device 20. The predictor 33 calculates a predicted value of each state quantity at a predetermined future time point from the plurality of state values acquired by the state value acquirer 32 using the estimation algorithm 43, and stores the predicted value in the storage device.

The index calculator 34 includes an importance calculator 35 and an urgency calculator 36. The importance calculator 35 and the urgency calculator 36 calculate a difference or a change rate of the difference between the state value acquired by the state value acquirer 32 and the predicted value of the state value calculated by the predictor 33 and stored in the storage device, and calculate an index indicating the importance and the urgency using the importance calculation algorithm 46 and the urgency calculation algorithm 48.

When the index calculated by the index calculator 34 meets a predetermined condition, the reporter 37 reports the fact. During the operation of the plant 3, the reporter 37 may report the fact to the operator by displaying a constantly calculated index on the operation panel 22, or when the index is a value worse than a predetermined value, the reporter may report the fact to the operator by displaying the fact on the operation panel 22. As a result, it is possible to report the fact that a state capable of affecting the important element has occurred to the operator.

The display 38 displays a matrix in which the importance and the urgency calculated by the index calculator 34 are plotted on a vertical axis and a horizontal axis on the operation panel 22. As a result, the importance and the urgency of the influence of the current state on the important element can be presented to the operator in a visually understandable manner. The display 38 displays a difference or a change rate of the difference between the predicted value calculated for each of the plurality of state values and the state value on the operation panel 22. As a result, it is possible to present, to the operator, which state value among the plurality of state values that can affect the important element indicates the abnormality and a degree of the abnormality of the state value. Therefore, it is possible to appropriately provide information to be referred to by the operator to change the setting value of the operation amount.

The learner 39 learns the cyberattack detection algorithm 64, the estimation algorithm 43, the importance calculation algorithm 46, or the urgency calculation algorithm 48. The learner 39 may relearn the cyberattack detection algorithm 64, the estimation algorithm 43, the importance calculation algorithm 46, or the urgency calculation algorithm 48 by a method similar to that of the cyberattack detection algorithm learning unit 60, the estimation algorithm learner 42, the importance calculation algorithm learner 45, or the urgency calculation algorithm learner 47 of the learning device 4. In a case where the cyberattack detection algorithm 64, the estimation algorithm 43, the importance calculation algorithm 46, or the urgency calculation algorithm 48 is relearned in the learning device 4, the learner 39 may not be provided.

Figure 7:
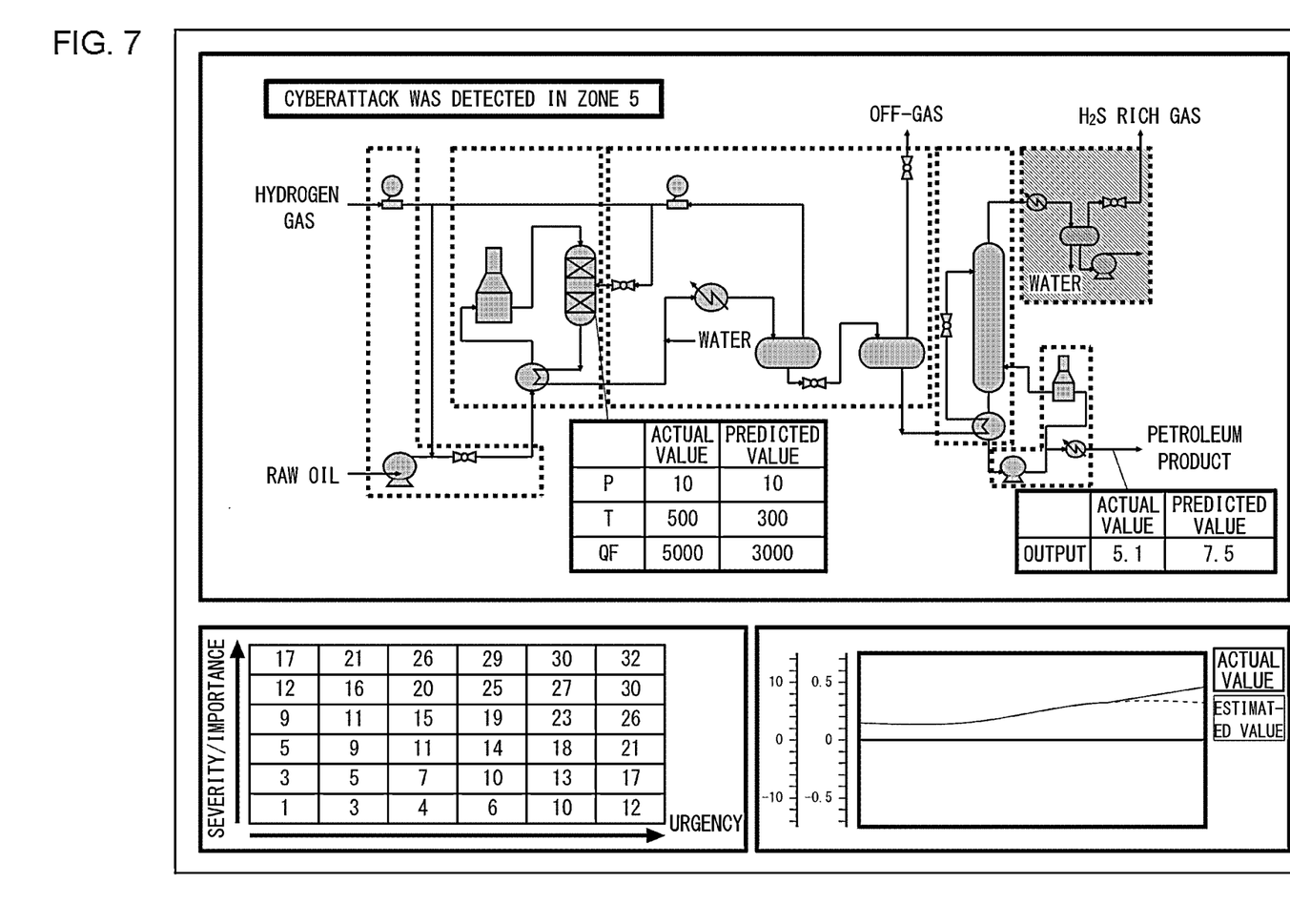
FIG. 7 is a diagram illustrating an example of a display screen displayed on a display device of an operation panel.

FIG. 7 illustrates an example of a display screen displayed on the display device of the operation panel. A process flow diagram of the plant 3, a plurality of state values, predicted values of the state values after a predetermined time, a matrix in which an importance and an urgency are plotted, and transition of the state values are displayed on the display screen. In the process flow diagram, a zone to which each of the plurality of components belongs is displayed. The operator determines a setting value of the operation amount with reference to the presented information and inputs the setting value to the operation panel 22. The operation amount setter 23 controls the control target device 10 on the basis of the input setting value.

The index calculator 34 calculates an index at a predetermined interval, and the display 38 plots the importance and the urgency of the index calculated at the predetermined interval in a matrix. That is, the matrix of the importance and the urgency is updated in real time, and indicates the state of the plant 3 at that time. The matrix display and the transition of the state value and the predicted value according to the present embodiment are always displayed on the operation panel 22. Therefore, even when an abnormality occurs, the operator can adjust the operation state of the plant 3 by changing the setting value of the operation amount while confirming the changes in the matrix display and the transition of the state value and the predicted value in real time.

When the cyberattack is detected, the cyberattack detector 65 displays the fact on the operation panel 22. Since the operator can accurately grasp the importance and the urgency of the influence of the cyberattack from the matrix, the operator can quickly consider and execute countermeasures such as zone isolation, switching to manual operation, operation continuation, and operation stop.

When the cyberattack is detected, the cyberattack detector 65 may automatically determine countermeasures such as isolation of the zone subjected to the cyberattack, switching to the manual operation, and operation stop, and automatically execute the determined countermeasures. In this case, the cyberattack detector 65 may automatically determine the countermeasures according to the index calculated by the index calculator 34. For example, the ranges of the values of the importance and the urgency and the contents of the countermeasures may be associated in advance. As a result, when the plant 3 is subjected to the cyberattack, it is possible to more quickly take appropriate countermeasures, so that it is possible to suppress the damage.

Figure 8:
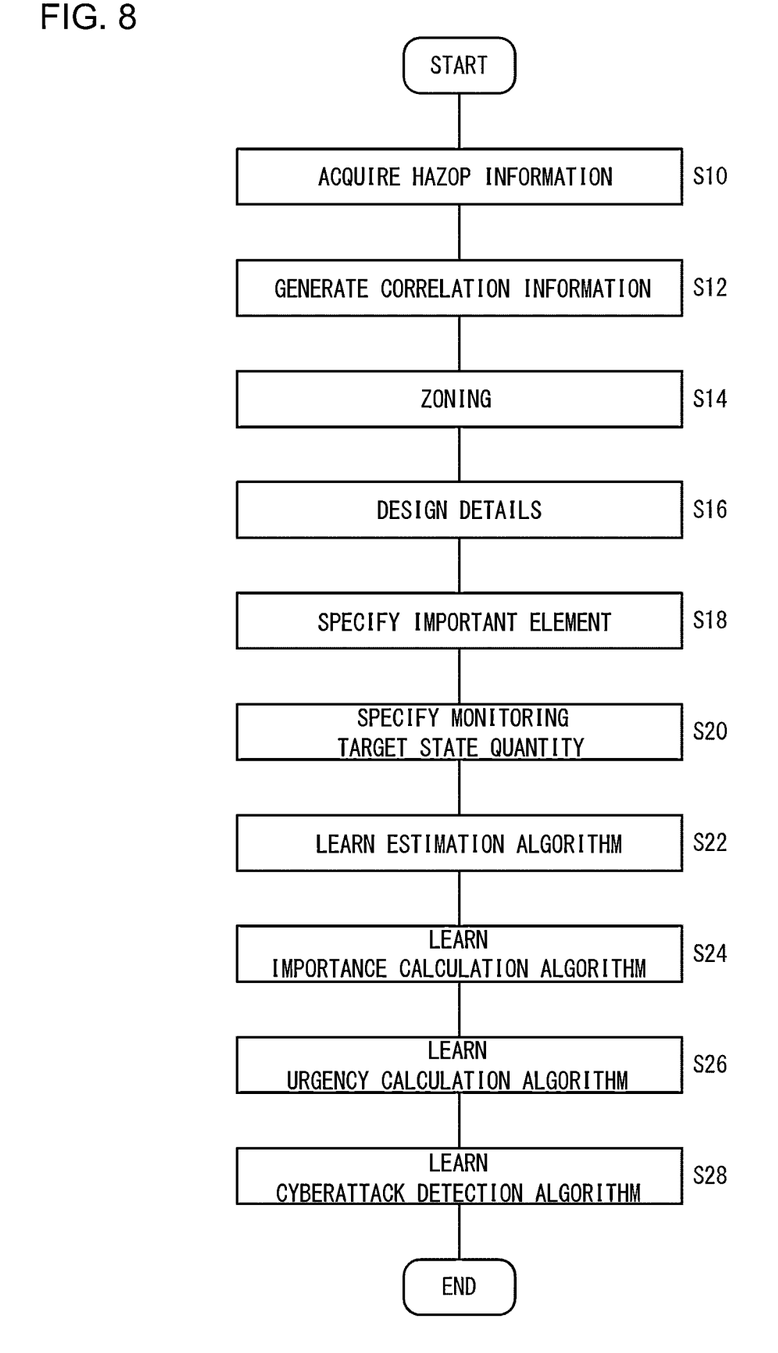
FIG. 8 is a flowchart illustrating a procedure of a plant management method according to the embodiment.

FIG. 8 is a flowchart illustrating a procedure of a plant management method according to the embodiment. This drawing illustrates a procedure for designing the plant 3. The HAZOP information acquirer 121 of the plant design device 100 acquires information generated or recorded in the HAZOP performed for a plurality of components constituting the plant 3 (S10). The correlation information generator 122 analyzes the HAZOP information to generate correlation information indicating a correlation between the plurality of components constituting the plant 3 (S12). The zoning executer 123 zones the plurality of components constituting the plant 3, on the basis of the correlation information generated by the correlation information generator 122 (S14). The plant design device 100 designs details of each zone (S16).

The plant design device 100 specifies an important element on the basis of the fault tree generated from the HAZOP information (S18), and specifies a state quantity that can be a factor of stop or failure of the important element as a monitoring target state quantity (S20).

The estimation algorithm learner 42 of the learning device 4 learns the estimation algorithm 43 for estimating a predicted value of the monitoring target state quantity (S22). The importance calculation algorithm learner 45 learns the importance calculation algorithm 46 (S24). The urgency calculation algorithm learner 47 learns the urgency calculation algorithm 48 (S26). The cyberattack detection algorithm learning unit 60 learns the cyberattack detection algorithm 64 (S28).

Figure 9:
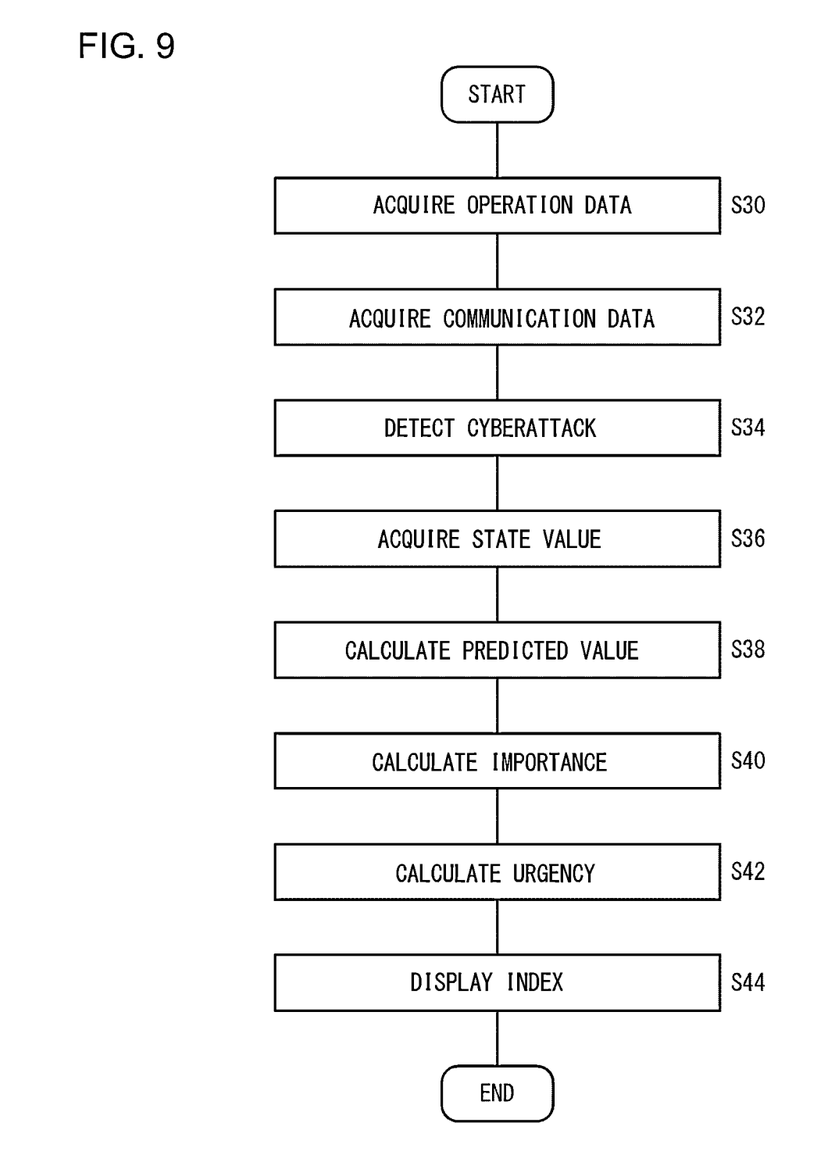
FIG. 9 is a flowchart illustrating a procedure of a plant management method according to the embodiment.

FIG. 9 is a flowchart illustrating a procedure of the plant management method according to the embodiment. This drawing illustrates a procedure for managing the operation of the plant 3. The operation data acquirer 66 of the plant management device 30 acquires operation data of the plant 3 (S30). The communication data acquirer 67 acquires data related to communication data transmitted and received by the network inside the plant 3, communication data transmitted and received between the network outside the plant 3 and the network inside the plant 3, or the like (S32). The cyberattack detector 65 uses the cyberattack detection algorithm 64 to detect the cyberattack on the plant 3 on the basis of the operation data acquired by the operation data acquirer 66 and the communication data acquired by the communication data acquirer 67 (S34).

The state value acquirer 32 acquires state values of a plurality of monitoring target state quantities (S36). The predictor 33 calculates a predicted value of each state quantity at a predetermined future time point from the plurality of state values acquired by the state value acquirer 32 using the estimation algorithm 43 (S38). The importance calculator 35 and the urgency calculator 36 calculate a difference or a change rate of the difference between the state value acquired by the state value acquirer 32 and the predicted value calculated by the predictor 33, and calculate an index indicating the importance and the urgency using the importance calculation algorithm 46 and the urgency calculation algorithm 48 (S40 and S42). The display 38 displays a matrix in which the calculated importance and urgency are plotted on a vertical axis and a horizontal axis on the operation panel 22 (S44).

The present disclosure has been described above on the basis of the embodiments. The embodiments are merely examples, and it is understood by those skilled in the art that various modifications can be made in the combination of the respective components or the respective processes, and that the modifications are also within the scope of the present disclosure.

The technology of the present invention can be applied to both a continuous process plant and a batch process plant.

The present invention can be used in a plant design device for designing a plant.

What is claimed is:

1. A plant management method comprising:
   acquiring correlation information indicating a correlation between a component subjected to a cyberattack and a component to be possibly affected by the cyberattack when a plant including a plurality of components is subjected to the cyberattack; and
   zoning the plurality of components on the basis of the correlation information, wherein
   the correlation information is a fault tree in which an important element selected from the plurality of components as a component having a large degree of influence on operation of the plant is set as an upper event, and
   the fault tree is generated by analyzing information generated or recorded when safety of the plant is evaluated.

2. The plant management method according to claim 1, wherein the information is generated or recorded in a HAZOP (Hazard and Operability Studies) or SIL (Safety Integrity Level) performed on a plurality of components constituting the plant at a time of evaluating safety of the plant.

3. The plant management method according to claim 2, further comprising:
   extracting, from the information, an operation trouble that may occur due to a failure, abnormality, or stop of the plurality of components constituting the plant, and
   generating the fault tree from an information of the extracted operation trouble.

4. The plant management method according to claim 1, further comprising:
   acquiring a plurality of state values indicating states of the plurality of components during operation of the plant;
   predicting a predicted value of each state value at a predetermined future time point on the basis of each of the plurality of acquired state values;
   calculating an index representing an importance indicating the magnitude of an influence on the important element by a difference or a change rate of the difference between each state value at the predetermined time point and each predicted value at the predetermined time point or a time point after the predetermined time point, or an urgency indicating urgency of the influence on the important element by the difference or the change rate of the difference; and
   presenting the calculated index.

5. The plant management method according to claim 4, wherein a matrix in which the index representing the importance and the index representing the urgency are plotted on a vertical axis and a horizontal axis is displayed.

6. The plant management method according to claim 4, wherein the predicted value is predicted by a prediction algorithm learned by machine learning based on a past actual value of each of the plurality of state values.

7. The plant management method according to claim 4, wherein the index is calculated by an index calculation algorithm in which the difference or the change rate of the difference calculated for the state value of each component is weighted on the basis of the magnitude of the influence on the important element.

8. The plant management method according to claim 7, wherein the index calculation algorithm is learned on the basis of a history of the predicted value and the actual value calculated for each state value and an evaluation of an operation behavior of a zone including the important element.

9. The plant management method according to claim 1, further comprising switching a control method of a component included in a zone for each zone zoned in the zoning, when it is detected that any one of the plurality of components constituting the plant has been subjected to the cyberattack.

10. The plant management method according to claim 9, wherein the control method of the component included in the zone is switched according to the index representing the importance or the urgency calculated in the calculating.

11. The plant management method according to claim 9, further comprising isolating a zone including the component subjected to the cyberattack and the other zones.

12. A plant design device comprising:
   an acquirer structured to acquire an information generated or recorded at a time of evaluating a safety of the plant;
   a correlation information generator structured to generate correlation information indicating a correlation between a component subjected to a cyberattack and a component to be possibly affected by the cyberattack when the plant including the plurality of components is subjected to the cyberattack; and
   a zoning executer structured to zone the plurality of components on the basis of the correlation information, wherein
   the correlation information generator generates, by analyzing the information acquired by the acquirer, the fault tree in which an important element selected from the plurality of components as a component having a large degree of influence on operation of the plant is set as an upper event.

* * * * *